Feb. 8, 1944.    R. S. HOPKINS    2,341,378
FILM CLAMPING MECHANISM FOR PROJECTORS
Filed Feb. 15, 1941    2 Sheets-Sheet 1
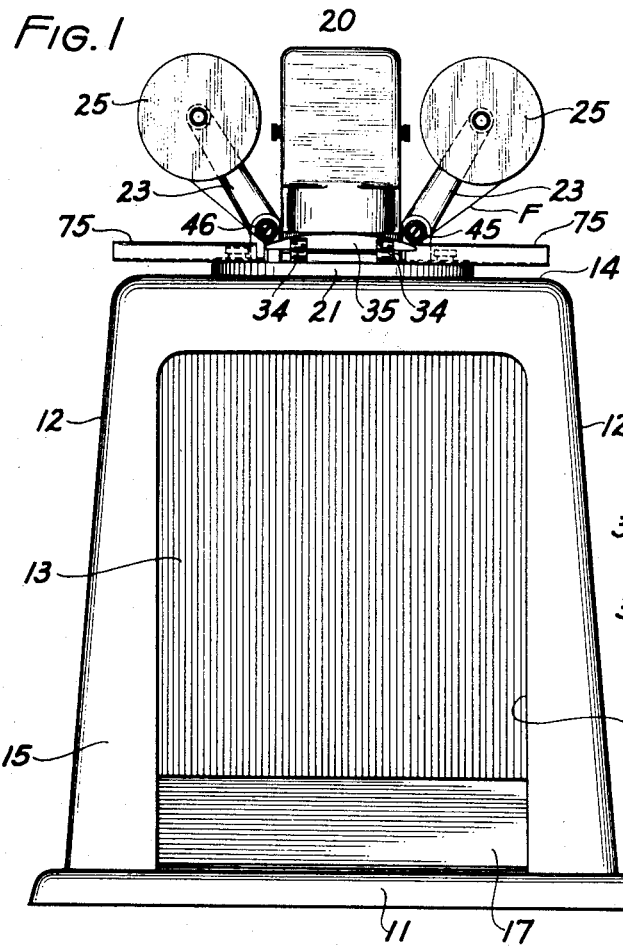
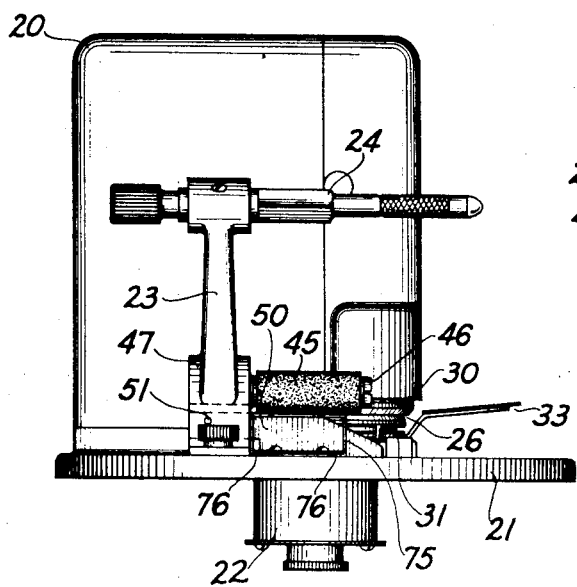
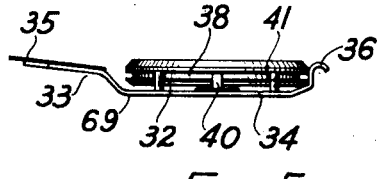
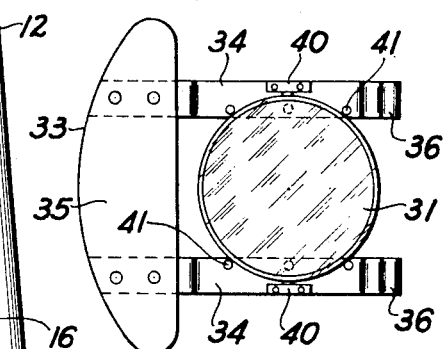
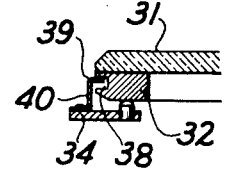
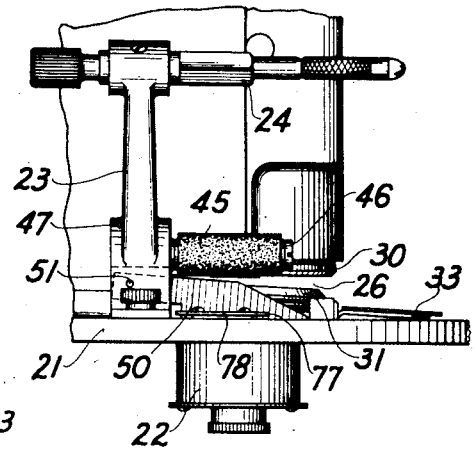
Roy S. Hopkins
INVENTOR
BY Newton M. Perrins
J. Griffin Little
ATTORNEYS Feb. 8, 1944.  R. S. HOPKINS  2,341,378
FILM CLAMPING MECHANISM FOR PROJECTORS
Filed Feb. 15, 1941  2 Sheets-Sheet 2
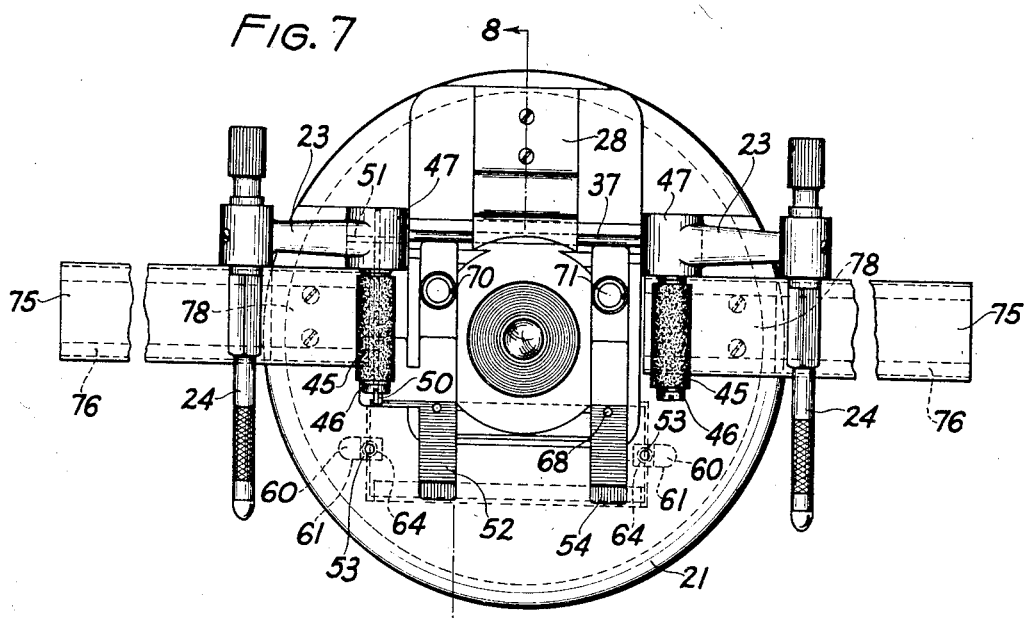
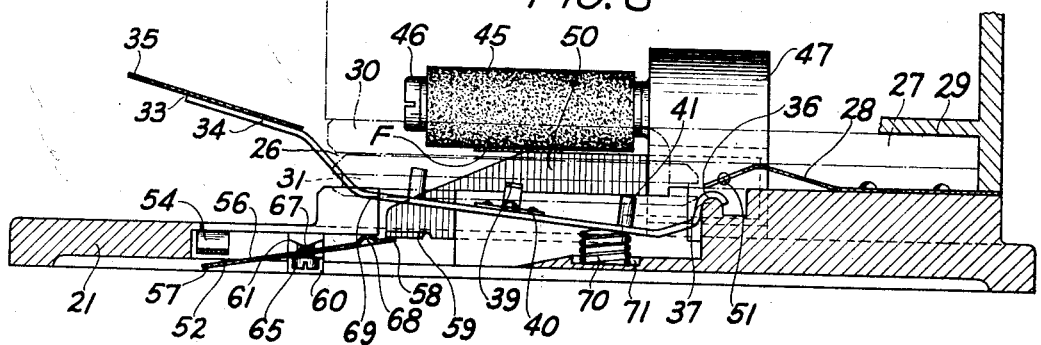
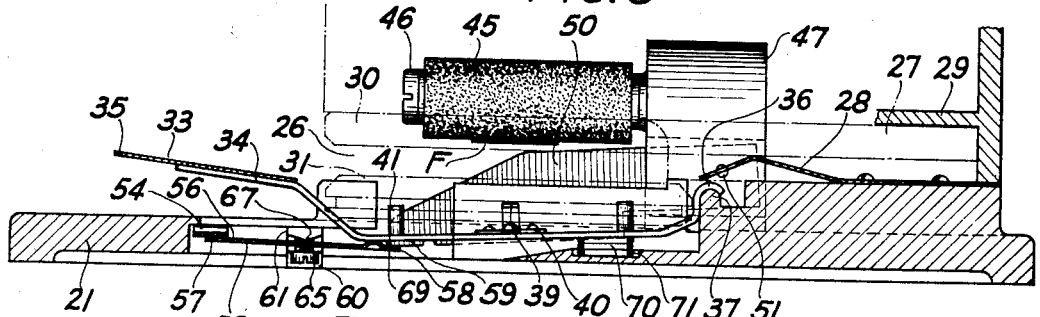
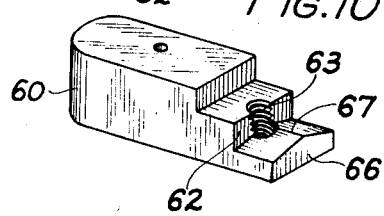
Roy S. Hopkins
INVENTOR
BY
ATTORNEYS Patented Feb. 8, 1944

2,341,378

UNITED STATES PATENT OFFICE 2,341,378

FILM CLAMPING MECHANISM FOR PROJECTORS

Roy S. Hopkins, Rochester, N. Y., assignor to Eastman Kodak Company, Rochester, N. Y., a corporation of New Jersey Application February 15, 1941, Serial No. 379,105

18 Claims. (Cl. 88—24)

The present invention relates to photography, and more particularly to an apparatus for projecting enlarged images from a miniature film strip.

The principal object of the invention is the provision of an arrangement for clamping the film against movement when the film gate is in the closed position, but for automatically releasing the film strip when the gate is opened.

Another object of the invention is the provision of a film clamping member which automatically moves into film engaging position when the gate is closed.

Still another object of the invention is the provision of a film clamping member which is operatively connected to and controlled by the gate opening mechanism so that upon opening the gate, the clamping member is simultaneously moved to film releasing position.

Yet another object of the invention is the provision of a film clamping and releasing mechanism which is simple in construction, automatic in its operation, and highly effective in use.

And another object of the invention is the provision of a novel and simplified supporting arrangement for the lower movable gate member.

To these and other ends, the invention resides in certain improvements and combinations of parts, all as will be hereinafter more fully described, the novel features being pointed out in the claims at the end of the specification.

In the drawings:

Fig. 1 is a front elevation view of a projection apparatus on which the film clamping mechanism of the present invention is mounted;

Fig. 2 is a side elevation of the upper portion or head of the projector illustrated in Fig. 1, but on a larger scale than the latter, showing the relation of the various parts when the gate members are in closed position;

Fig. 3 is a view similar to Fig. 2, but with the gate members in open position to permit the film strip to be slid or adjusted in position therebetween;

Fig. 4 is a side elevation view of the lower or movable gate member and its supporting bracket detached from the projector head;

Fig. 5 is a plan view of the lower gate member and its supporting bracket, illustrated in Fig. 4, showing the relation of the various parts;

Fig. 6 is a fragmentary sectional view through the lower gate member and its bracket, showing the arrangement for operatively and pivotally connecting the lower gate member to the bracket;

Fig. 7 is a plan view of the projector head, with the housing and lamp removed, showing the relation of the film gate and the film clamping mechanism;

Fig. 8 is a horizontal sectional view taken on line 8—8 of Fig. 7, but on a larger scale than the latter, showing the arrangement for mounting the lower gate member and supporting bracket, and the position of the bracket and the film clamping mechanism when the gate is in closed position;

Fig. 9 is a view similar to Fig. 8 but with the gate in the open position showing the arrangement for moving the film clamping member to an inoperative position; and Fig. 10 is a perspective view of one of the members for pivotally or rockably mounting the plate which actuate the movable film clamping member.

Similar reference numerals throughout the various views indicate the same parts.

The drawings show an apparatus for projecting images of a miniature film strip onto a suitable reading surface or screen. The device comprises, broadly, a housing having a base 11, opposite side walls and a back wall 12 and 13 respectively extending upwardly from said base and connected at the top edges by a top or closure member 14 to form a hollow structure, the front 15 of which is formed with a suitable opening 16 for viewing the image projected onto an inclined viewing screen 17 positioned on the base 11, all of which is well known to those in the art.

The top 14 supports a projection head, broadly designated by the numeral 20, in which the light source, and other various optical members are housed. As these elements do not constitute a part of the present invention, a detailed showing and description thereof are not deemed necessary. This projection head is formed with a circular plate 21 which is suitably connected to the top 14 and which has extending therefrom an objective lens tube 22 in which are mounted suitable objective lenses which project the image onto the viewing screen 17. A pair of brackets 23 extend upwardly from the plate 21 and have reel supporting spindles 24 rotatably mounted in the free end thereof, as clearly shown in Figs. 1 and 7. These spindles are adapted to receive film reels 25, in a well-known manner, and are freely rotatable to permit feeding of the film strip in either direction through the film gate, broadly designated by the numeral 26.

This film gate comprises, in the present embodiment, a stationary upper gate member 27 in the form of a rectangular sheet of heavy glass which is slid into position in the head 20, and is held therein by a spring 28, see Figs. 8 and 9, which yieldably presses the glass gate member 27 upwardly against a pair of inwardly extending flanges or ribs 29, see Figs. 8 and 9. The front portion 30 of the gate member 27 extends over the objective tube 22, and cooperates with a lower gate member, broadly designated by the numeral 31, to retain an image area in position for projection. This lower gate member is also in the form of a sheet of heavy glass which is circular in shape and suitably mounted on an annular member 32 of metal, which, in turn, is mounted on and supported by a bracket, generally indicated by the numeral 33, and to be presently more fully described.

This supporting bracket 33 for the lower gate member is substantially U-shaped, see Fig. 5, and is formed to provide a pair of spaced members or arms 34, of the shape best shown in Figs. 8 and 9, the outer ends of which are connected by a connecting member or strip 35 which is secured to the arms 34 in any suitable and well-known manner. The inner end of each of the arms 34 is formed with a hook-shaped portion 36 which is adapted to engage a similarly shaped portion 37 on the plate 21, see Figs. 8 and 9, to thus provide a pivotal support for the bracket 33, and hence the lower gate member 31. The annular ring 32 for the lower gate member 31 is formed with a circumferential groove 38, see Fig. 6, adapted to receive inwardly turned flanges 39 formed on clips 40 secured to the arms 34, in any suitable and well-known manner, and connecting the ring 32 at diametrically opposite points to the arms 34, as indicated in Fig. 5. These clips thus afford aligned pivots for the lower gate member which permit the latter to rock slightly relative to the arms 34 so that the lower gate member may adjust itself in parallel relation to the upper gate member, as is apparent. Upwardly extending pins or lugs 41 on the arms 34 engage the periphery of the lower gate member, see Fig. 5, at four spaced points to properly retain the gate member 31 in position on the arms 34.

It is apparent from the above description, that if the bracket 33 is moved downwardly, the lower gate member 31 will be moved away or separated from the upper gate member 27 to open the gate 26 to permit the film strip to be moved therethrough or adjusted therein. On the other hand, upward movement of the bracket 33 will move the lower gate member 31 upwardly as a unit therewith to bring the two gate members into film retaining position, as will be readily apparent to those in the art.

The film strip upon leaving one of the reels 25 passes under a rubber roller 45 which serves to guide the film strip between the two gate members. Duplicate rubber rollers 45 are positioned on opposite sides of the film gate, and have the lowest points on the peripheries thereof in substantial alignment with the plane occupied by the film strip in the gate, for obvious reasons. Each of these rollers is carried on a spindle 46 suitably secured to an upstanding lug or support 47 formed on the plate 21, see, for examples, Figs. 1, 2, 8 and 9. The film strip, when the film gate is open, is drawn from one of the film reels 25, under one of the guide rollers 45, then through the gate between the open gate members 30 and 31, and then under the opposite guide rollers 45, and is finally wound up on the opposite reel 25.

By means of this arrangement, the film strip may be moved in either direction through the film gate. It is desirable, however, that the film strip be moved through the film gate only when the latter is in open position, the advantages of which will be readily apparent to those familiar with projectors or film mechanisms of the class described. To this end, the present invention provides an arrangement for securely clamping the film strip when the film gate is closed so as to prevent film movement at such time. When, however, the film gate is open, the clamping member is rendered ineffective so that the film may be free so that it may be readily and easily fed through the gate, yet when the gate is again closed, the clamping member is again automatically moved to film clamping position. In the preferred embodiment of the invention, the release of this film clamping means is controlled or actuated from the film gate opening mechanism so that the release of the clamping means will be simultaneous with the opening of the gate, while the engagement of the clamping means will also be simultaneous with the closing of the gate.

This clamping means comprises, in the present embodiment, an arm 50 which lies below but substantially on the vertical axis of one of the rollers 45, see Fig. 7, so as to cooperate therewith to pinch or clamp the film strip therebetween when the arm is in its upward position, as shown in Fig. 8. When, however, the arm 50 is allowed to drop, as shown in Fig. 9, the arm will move away from the roller 45 to release the film strip, as shown in Fig. 9. The arm 50 is of the shape best shown in Figs. 8 and 9, and is pivoted at 51 adjacent one end thereof in the lugs 47, see Figs. 7, 8 and 9. It is thus apparent that the arm 50 is of the cantilever type, and, if free, will tend to fall to the position shown in Fig. 9 to release the film strip.

The arm 50 is, however, normally held in film clamping position, as shown in Fig. 8, by means of a plate 52 pivotally mounted on opposite sides at 53 on the under side of the plate 21, see Figs. 8 and 9. A bowed leaf spring 54 is held in place between the plates 21 and 52, and has the ends engaging the plate 21 and the bowed center portion lying against the upper face 56 of the plate 52 adjacent one end 57 thereof, as shown in Figs. 8 and 9. This spring 54 thus tends to rotate the plate 52 in a counterclockwise direction about its pivots 53 to bring the opposite or right end 58 thereof, as viewed in Figs. 8 and 9, under the free end 59 of the arm 50 to rotate the latter in a clockwise direction about its pivot 51 to move the arm 50 upwardly and into film clamping position, as shown in Fig. 8. The arm 50 is thus normally resiliently retained in position, by means of the plate 52, to cooperate with the roller 45 to securely clamp the film strip to hold the latter against movement when the film gate is in closed position.

This retaining plate is pivotally or rockably mounted on the plate 21 at points 53, as above described. These pivot points are arranged in lateral alignment to engage opposite sides of the plate, as best shown in Fig. 7. Each of these pivots comprise a lug 60, of the shape best shown in Fig. 10, slidably mounted in milled slots 61 formed on the under surface of the plate 21. Each of these lugs 60 is formed with a shoulder 62 with which one of the side edges of the plate 52 engages to laterally position the plate. Each of these shoulders 62 of the lugs 60 is formed with a semi-circular opening 63 which cooperates with a complementary opening 64 formed on the plate 52 to receive a screw 65 which extends upwardly through an inwardly extending lip 66 of the lug 60 and engages in a registering threaded hole in the plate 21, all as shown in Figs. 8, 9 and 10. By means of this arrangement, the lugs 60 are securely retained in position on the plate 21, and the screws 65 and shoulders 62 serve to retain the plate 52 in position. The under side of each of the lip portions 66 is formed with inclined faces which terminate in a substantially knife edge 67 which supports the plate 52 at one edge thereof. As these knife edges are arranged in lateral alignment, they afford an axis about which a plate 52 may rock or pivot.

As pointed out above, the spring 54 serves to retain the plate 52 in engagement with the free end 59 of the arm 50 to hold the latter in film clamping position, as shown in Fig. 8. By referring to Figs. 8 and 9, it is seen that the right end 58 of the plate 52 extends under both of the arms 34 of the lower gate bracket 33 and has formed on the face 56, thereof a pair of small protuberances or cams 68 arranged in vertical alignment with the arms 34. Now, when the film gate is to be opened, the connecting member 35 of the bracket 33 is pressed downwardly, thus causing the bracket arms 34 to move about their pivots 37 to rock the bracket of the lower gate member 31 in a counter-clockwise direction, see Figs. 8 and 9, to move the lower gate member away from the upper stationary member 27 to open the gate. This downward movement of the arms 34 causes the under sides 59 thereof to engage the cams 58 of the plate 52 to rock the latter in a clockwise direction about its knife edge supports or pivots 67 against the action of the spring 54. This movement of the plate 52 moves the end 58 thereof out of engagement with the end 59 of the arm 50. As the latter is now free, it will fall downwardly, pivoting about its pivot point 51, to the position shown in Fig. 9 at which point it has moved out of clamping engagement with the film strip.

Thus the actuation of the gate opening mechanism to open the gate has also served to permit the automatic and simultaneous movement of the arm 50 to a film releasing position to unclamp the film so that the latter may be freely and easily moved through the film gate. When, however, the connecting member 35 of the lower gate bracket is released, the lower gate member is moved automatically toward the upper gate member to close the gate to carry the film strip therebetween. This automatic closing of the gate is secured by means of a pair of coil springs 70 which have the lower ends resting in slots 71 formed in the plate 21 and the upper ends engaging the under surfaces of the arms 34 to move the latter, and hence the gate member 31, into gate closing position, all of which will be apparent from an inspection of Figs. 8 and 9. As the arms 34 thus move upwardly under the action of the springs 70, they move out of engagement with the cam 68 of the plate 52. As the latter is now free, it is rocked in a counter-clockwise direction about its knife edge pivots 67 by means of the spring 54. This movement of the plate 52 again brings the end 58 thereof under the free end 59 of the arm 50 to return or lift the latter to the position shown in Fig. 8 where it will now again cooperate with the roller 45 to clamp the film strip against movement. While only one clamping arrangement has been shown, it is contemplated that a duplicate arrangement may be placed on opposite sides of the film gate. It has been found, however, that a single clamping means, as shown, is sufficient to retain the film against movement when the gate is in its closed position.

The above-described arrangement has been described in connection with a film strip wound up in a relatively long roll on the film reel 25. It is often desirable, however, to project from relatively short strips of film. To this end, the present invention also provides a pair of auxiliary guide members 75 which serve to support a short strip of film, as it is fed into and out of the film gate. These auxiliary guides are formed with inwardly turned flanges 76 which are adapted to slide under the raised upper edges 77 of plate 78 secured to the top of the plate 21 on opposite sides of the film gate. Suitable stops, not shown, may be provided for properly positioning the guides 75 on the plate 21. When the film reels are to be used, the guides 75 may be removed, if desired, or they may be left in place, as they do not in any way interfere with the film strip being fed from the film reels.

From the above description, it is apparent that the present invention provides a simple and effective means for clamping the film strip to hold the latter against movement when the film gate is in closed position. In addition, the gate opening mechanism is utilized to automatically move the clamping means to its film releasing position upon opening the film gate. The closing of the gate, however, serves to automatically and simultaneously return the clamping means to film engaging position.

While only one embodiment of the invention has been disclosed, it is contemplated that the inventive idea may be carried out in a number of ways. For example, and by way of illustration as another arrangement for carrying out the inventive idea, the arm 50 and the adjacent arm 34 of the bracket 33 may be so shaped and/or positioned that the adjacent arm 34 will underlie the free end 59 of the arm 50. With such an arrangement, the moving of the gate to the closed position serves to bring the arm 34 into engagement with and lifts the arm 50 to move the latter into film clamping position. When, on the other hand, the bracket 33 is lowered to open the gate, the arm 34 will be moved away from the end 59 of the arm 50 and the latter will automatically drop to its film releasing position shown in Fig. 9. The present invention is, therefore, not to be limited to the precise details disclosed but is intended to cover all modifications thereof which fall within the scope of the appended claims.

I claim:

1. In a photographic apparatus, the combination with a support, a film gate mounted on said support and adapted to receive an image area of a film strip, of clamping means independent of said gate and carried by said support and adapted to engage said strip to hold the latter against movement when said gate is closed, and means for simultaneously opening said gate and releasing said clamping means to permit movement of said strip in said gate.

2. In a photographic apparatus, the combination with a support, a gate mounted on said support and adapted to receive an image area of a film strip, means carried by said support for opening said gate, of clamping means mounted on said support and independent of said gate and adapted to engage said strip outside of said gate to hold the latter against movement when said gate is closed, and means controlled by said gate opening means for actuating said clamping means to release the latter when said gate is opened to permit the movement of said strip therein.

3. In a photographic apparatus, the combination with a support, a gate mounted on said support and adapted to receive an image area of a film strip, means carried by said support for opening and closing said gate, of clamping means on said support independent of said gate and comprising a stationary member and a movable member adapted to engage said strip to hold the latter against movement when said gate is closed, means controlled by said gate opening means for releasing said clamping means independent of said gate closing means when said gate is opened, and means for moving said movable clamping member to film holding position when said gate is closed.

4. In a photographic apparatus, the combination with a supoprt, a film gate mounted on said support and adapted to receive an image area of a film strip, of a guide member mounted on said support outside of said gate for guiding said strip into said gate, a holding member independent of said gate and movably mounted on said support and adapted to cooperate with said guide member to hold said strip against movement when said gate is closed, and means for simultaneously opening said gate and for moving said holding member out of film holding position to permit said strip to be moved in said gate.

5. In a photographic apparatus, the combination with a support, a film gate mounted on said support and adapted to receive an image area of a film strip, of a guide member mounted on said support for guiding said strip into said gate, a holding member movably mounted on said support and adapted to cooperate with said guide member to hold said strip against movement, means for simultaneously opening said gate and for moving said holding member out of film holding position to permit said strip to be moved in said gate, and means for moving said holding member into cooperative relation with said guide member when said gate is in closed position to clamp said strip against movement.

6. In a photographic apparatus, the combination with a support, a gate mounted on said support and adapted to receive an image area of a film strip, means carried by said support for opening said gate, of clamping means comprising a guide member mounted on said support adjacent said gate and adapted to guide said strip through said gate and an arm movably mounted on said support, means adapted to engage said arm to move the latter to film clamping position to hold said film against movement, and means controlled by said gate opening means for actuating said arm engaging means to move the latter out of engagement with said arm to permit the latter to move out of film clamping position.

7. In a photographic apparatus, the combination with a support, a gate mounted on said support and adapted to receive an image area of a film strip, means carried by said support for opening said gate, of clamping means comprising a guide member mounted on said support adjacent said gate and adapted to guide said strip through said gate and an arm movably mounted on said support, means adapted to engage said arm to move the latter to film clamping position to hold said film against movement, means controlled by said gate opening means for moving said arm engaging means in one direction and out of contact with said arm to permit the latter to move out of film clamping position, and means for moving said arm engaging means in the opposite direction to engage and move said arm into film clamping position.

8. In a photographic apparatus, the combination with a support, a film gate mounted on said support and adapted to receive an image area of a film strip, of clamping means comprising a guide member mounted on said support adjacent said gate and adapted to guide said strip through said gate and a member movably mounted on said support and adapted to engage said strip to hold the latter against movement, means movably mounted on said support and adapted to engage said movable member to retain the latter in strip clamping position, and means for moving said movably mounted member out of engagement with said member to permit the latter to move out of film clamping position.

9. In a photographic apparatus, the combination with support, a film gate mounted on said support and adapted to receive an image area of a film strip, of clamping means comprising a guide member mounted on said support adjacent said gate and adapted to guide said strip through said gate and a horizontally arranged arm mounted on said support and movable into engagement with said strip to clamp the latter against movement, a member movably mounted on said support and adapted to engage said arm, means for moving said member in one direction to engage and move said arm into film clamping position, and means for moving said member in the opposite direction and out of engagement with said arm to permit the latter to drop out of film clamping position.

10. In a photographic apparatus, the combination with a support, a film gate mounted on said support and adapted to receive an image area of a film strip, of clamping means comprising a guide member mounted on said support adjacent said gate and adapted to guide said strip through said gate and a horizontally arranged arm mounted on said support and movable into engagement with said strip to clamp the latter against movement, a member movably mounted on said support and adapted to engage said arm, means for moving said member in one direction to engage and move said arm into film clamping position, means for moving said member in the opposite direction and out of engagement with said arm, and means for pivotally mounting said arm on said support so that said arm will automatically move out of film clamping position when said member is moved in said opposite direction.

11. In a photographic apparatus, the combination with a support, a film gate mounted on said support and adapted to receive an image area of a film strip, of a guide member mounted on said support adjacent said gate and adapted to guide said strip thereinto, a cantilever arm pivotally mounted on said support adjacent said guide member, an actuating member movably mounted on said support, means for moving said actuating member in one direction to engage said arm to move the latter into cooperating relation with said guide member to clamp said strip, and means for moving said actuating member in the opposite direction to disengage said arm to permit the latter to move about its pivot and out of clamping relation with said strip.

12. In a photographic apparatus, the combination with a support, a film gate mounted on said support and adapted to receive an image area of a film strip, of a guide member mounted on said support adjacent said gate and adapted to guide said strip thereinto, a cantilever arm pivotally mounted on said support adjacent said guide member, an actuating member movably mounted on said support, a plate pivotally mounted on said support, a spring engaging said plate to move the latter in one direction about its pivot to engage said arm to move the latter into cooperating relation with said guide to clamp said film strip, and means for pivoting said plate in the opposite direction to move it out of engagement with said arm so that the latter will be free to move about its pivot and to drop out of cooperating relation with said guide to release said strip.

13. In a photographic apparatus, the combination with a support, a film gate comprising a stationary gate member carried by said support, a second gate member movable toward and away from said stationary gate member to close and open said gate, of a pair of spaced arms pivotally mounted at one end on said support, means for operatively connecting said arms to said second gate member to support the latter, means engaging said arms for moving the latter and said second gate member in one direction to close said gate, and means connected to said arms for moving the latter and said second gate member in the opposite direction to open said gate.

14. In a photographic apparatus, the combination with a support, a film gate comprising an upper stationary gate member carried by said support, a lower gate member cooperating with said upper gate member to retain a film strip in position therebetween, of a bracket pivotally mounted on said support adjacent said gate members, means for rockably connecting said lower gate member on said bracket so that the latter will movably support said lower gate member, means on said bracket for positioning said lower gate member thereon, means on said support engaging said bracket to move the latter and said lower gate member toward said upper gate member to close said gate, and means on said bracket for moving the latter and said lower gate member away from said upper gate member to open said gate.

15. In a photographic apparatus, the combination with a support, a film gate comprising an upper stationary gate member carried by said support, a lower gate member cooperating with said upper gate member to retain a film strip in position therebetween, of a U-shaped bracket formed with spaced arms having the free ends thereof pivotally mounted on said support adjacent said gate, means carried by said arms for rockably connecting the lower gate member thereto, spaced pins on said arms extending upwardly therefrom and engaging said lower gate member to position the latter on said arms, springs mounted on said support and engaging said arms to urge the latter and said lower gate member toward said upper member to close said gate, and an operating portion on said bracket connecting said arms at the ends opposite their pivots for moving said arms about their pivots in a direction away from said upper gate member to separate said gate members so that said strip may be moved therebetween.

16. In a photographic apparatus, the combination with a support, a film gate comprising a stationary gate member carried by said support, a second gate member movable toward and away from said stationary gate member to close and open said gate, of a pair of spaced cantilever arms pivotally mounted on said support adjacent said gate members, means for operatively connecting said second gate members to said arms so that the latter may support said second gate member, springs mounted on said support and engaging said arms to pivot the latter in one direction to move second gate member toward said stationary gate member to close said gate, and means connecting the free ends of said arms for pivoting the latter in the opposite direction to move said second gate member away from said stationary gate member to open said gate.

17. In a photographic apparatus, the combination with a support, a gate comprising a stationary gate member mounted on said support, a movable gate member adapted to be moved toward or away from said stationary member to close or open said gate, of a bracket pivotally mounted on said support, means for operatively connecting said movable gate member to said bracket, means engaging said bracket for moving the latter and said movable member toward said stationary member to close said gate to clamp a film strip in position therebetween, a clamping member carried by said support and adapted to engage said strip to clamp the latter against movement when said gate is closed, means engaging said clamping member to retain the latter in clamping engagement with said strip, and means for simultaneously moving said bracket and said movable gate member away from stationary gate member to open said gate and for moving said clamping member retaining means out of engagement with said clamping member to permit the latter to release said strip.

18. In a photographic apparatus, the combination with a support, a gate comprising a stationary gate member mounted on said support, a movable gate member adapted to be moved toward or away from said stationary member to close or open said gate, of a bracket pivotally mounted on said support, means for operatively connecting said movable gate member to said bracket, means engaging said bracket for moving the latter and said movable member toward said stationary member to close said gate to clamp a film strip in position therebetween, a film guide mounted on said support adjacent said gate for guiding said strip between said gate members, an arm pivotally mounted on said support and adapted to cooperate with said guide to clamp said film strip therebetween to prevent movement of the latter in said gate, a pivotally mounted plate carried by said support and having a portion adapted to engage said arm, means for rocking said plate in one direction to move said arm into clamping relation with said guide, and means on said bracket for moving the latter and said movable gate member away from said stationary gate member to open said gate and to cause simultaneously said bracket to engage and rock said plate in the opposite direction to move said plate out of engagement with said arm to permit the latter to move about its pivot to strip release position.

ROY S. HOPKINS.